A. L. FORREST.
NONSKID DEVICE FOR AUTOMOBILE WHEELS.
APPLICATION FILED JUNE 4, 1921.
1,410,906.
Patented Mar. 28, 1922.
2 SHEETS—SHEET 2.
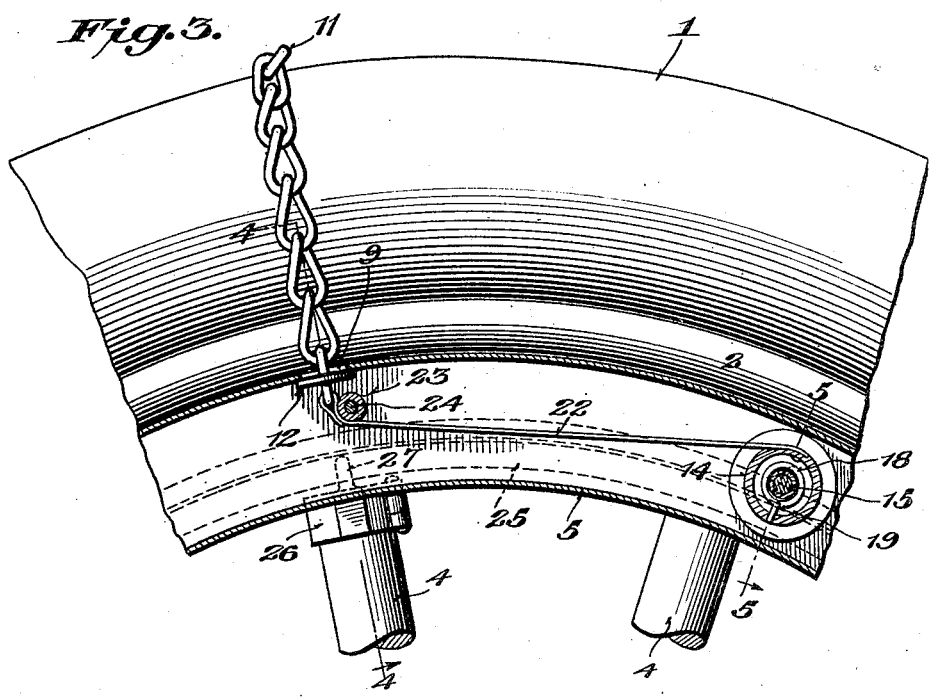
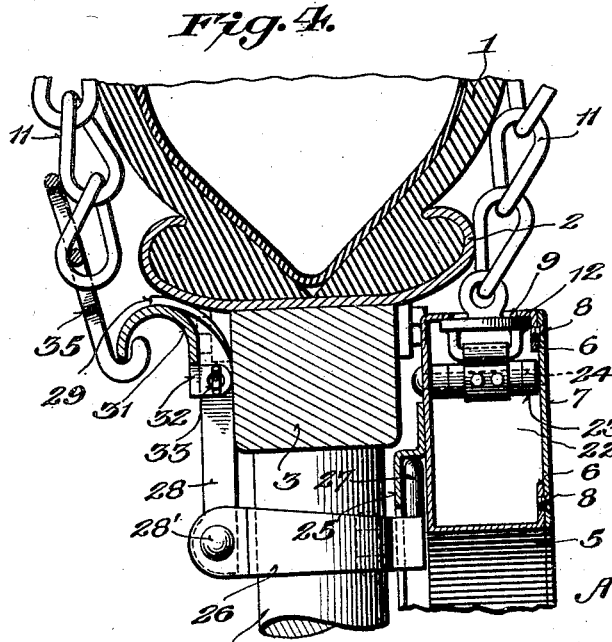
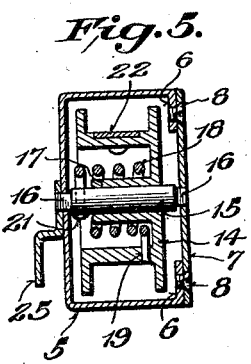
Inventor
Alfred L. Forrest,
By Semmes & Semmes
Attorneys
WITNESS:—
Chas. L. Grieshauer

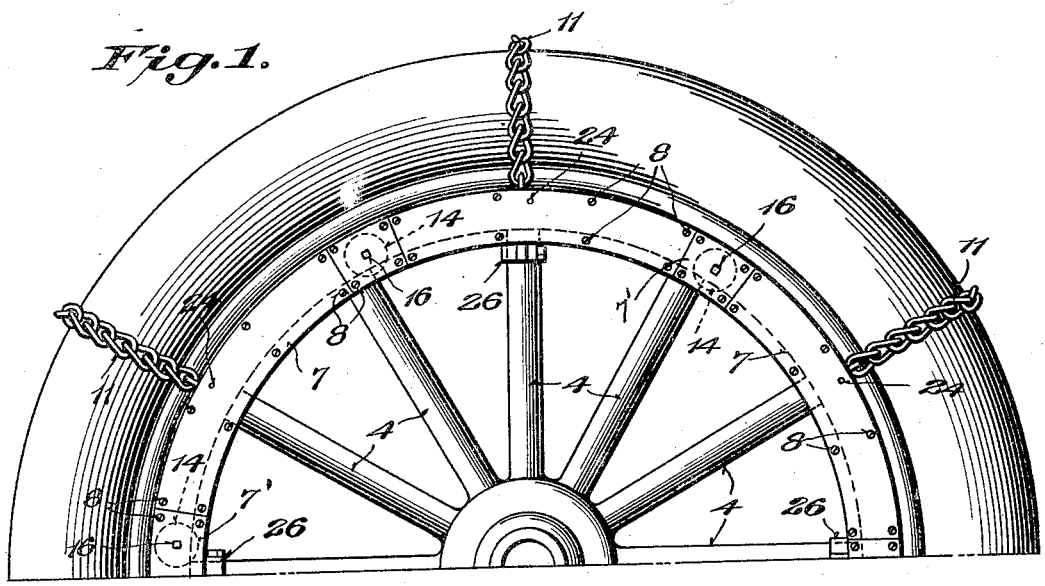
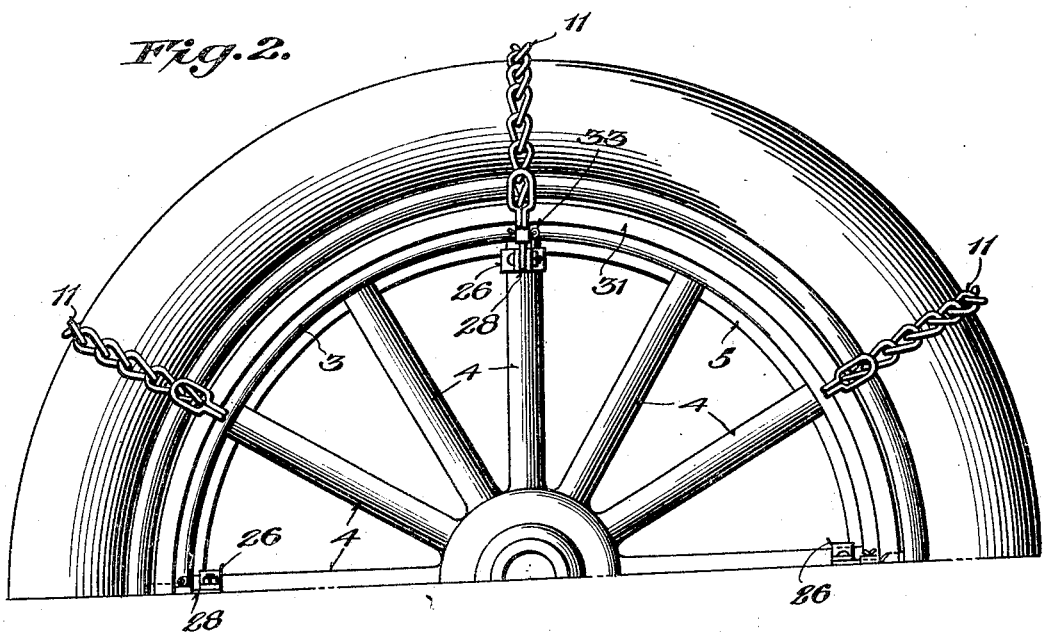

UNITED STATES PATENT OFFICE.

ALFRED LOWTHER FORREST, OF BALTIMORE, MARYLAND.

NONSKID DEVICE FOR AUTOMOBILE WHEELS.

1,410,906.  Specification of Letters Patent.  Patented Mar. 28, 1922.

Application filed June 4, 1921. Serial No. 474,874.

*To all whom it may concern:*

Be it known that I, ALFRED LOWTHER FORREST, a subject of the King of Great Britain, residing at Baltimore, in the State of Maryland, have invented certain new and useful Improvements in Nonskid Devices for Automobile Wheels, of which the following is a specification.

My invention relates to non-skid attachments for vehicle tires and more particularly to attachments of the chain type.

An object of my invention is to provide detachable chains that can be carried by the wheel and easily snapped into position across the tire.

Another object of my invention is to provide a housing for the chains on the wheel that is small and neat in appearance.

Another object of my invention is to allow the chains carried by the housing to progress or slide around the tire, thus preventing breakage of the chains and wear of the tire in any one place.

Heretofore the anti-skid devices for tires which I have formerly employed used detachable chains carried by housings on the wheel, but there was no provision made for the sliding of the chains along the surface of the tire. The disadvantage of this old structure was twofold. First, the chains had a tendency to wear out the surface of the tire in particular places, thus materially shortening the life of the tire. Second, the chains themselves were subject to breakage since a sudden jar or jerk upon the chains, such as occurred in passing over an obstacle had a tendency to place such great strain upon the links that they snapped.

My invention comprises an anti-skid device for tires of vehicle wheels in which a plurality of chains are adapted to fit over the tire. These chains are carried by slidable housing on one side of the vehicle wheel. Structure permitting the sliding of the housing or more properly rotation upon the wheel is provided. On the other side of the wheel a detachable channel is formed and the chains carried by the housing are stretched across the tire and hooks on the ends snapped into the detachable channel. Since the hooks may slide within the detachable channel and since the housing itself is slidable and chains may slide when subjected to unusual strains there may be considerable play.

In the drawings:

Figure 1 is a side elevation of a half of a vehicle wheel showing the application of my invention thereto.

Fig. 2 is a side elevation of the reverse side of the wheel shown in Fig. 1.

Fig. 3 is a detail partly in section showing the operation of the chain within the housing.

Fig. 4 is a detail of a cross section taken on the lines 4—4 of Fig. 3.

Fig. 5 is a detail showing a cross section of a drum for withdrawing the chains within the housing.

In the drawings I have shown a vehicle tire 1 mounted upon a rim 2 which is carried upon a felly 3 to which are attached spokes 4. On one side of the tire I have shown a slidable housing 5 formed of sheet metal bent into a U-shape. At the throat of the U the metal is inwardly bent at 6 so that detachable cover plates 7 may be securely fastened thereto through screws 8 which pass through apertures in the cover plates 7 and are screwed into the inwardly bent flanges 6. The slidable housing 5 is provided with apertures 9 in its upper surface through which chains 11 adapted to fit over the tire may pass. The chains 11 are provided with stops 12 that are larger than the apertures 9 and prevent the chains 11 from being entirely withdrawn from the housing.

Mounted within the housing are drums 14 adapted to rotate upon shafts 15 that are formed square at their extremities 16. The cover plates 7 are formed with small covers 7' adjacent the drums 14 to enable the covering to be readily detached at those points. The extremities 16 of the shaft 14 pass through square apertures in the slidable housing 5 and the cover plates 7' and hold the shafts 15 from any possible rotation. The drums 14 are formed with an interior shank 17 that fits over the shaft 15 and upon which a helical spring 18 is coiled. The spring 18 is fastened at one end 19 firmly to the drum 14 and at the other end 21 passes through the shaft 15. This construction permits the drums to be removed at any time to repair them by simply removing the cover plates 7. By reason of the non-rotatable shafts 15 and because the helical spring 18 is attached at one end to the shaft 15 and at the other end to the drum 14, the drum 14 when rotated will wind up the helical spring 18 and upon release of the drum the spring will cause the drum to rewind. Attached to the drum 14 is a flexible member 22. I have shown the flexible member 22 as comprising a steel strap but it is to be understood that it might be a cable or cord.

The strap 22 is fastened at its other end to the stop 12 and passes over a roller 23 journalled on a shaft 24, which passes through the slidable housing 5 and the cover plates 7. The shaft 24 is adapted to be attached firmly in place within the slidable housing 5 but is not so attached to the cover plates 7. This enables the cover plate 7 to be removed without disturbing the roller 23. These rollers 23 permit the chains 11 to easily pass to their withdrawn position within the housing 5, which immediately takes place when the chains 11 are removed from their position around the tire 1 since the spring 18 in the drum 14 is wound tight in the position shown in Fig. 3 with the chains stretched across the tire. Immediately when the chains are disengaged from around the tire the drum 14 draws upon the flexible member 22 and withdraws the chain into the tire.

The slidable housing 5 is provided with an annular guide member 25. Attached to the spokes 4 at any convenient number of spokes apart (in the drawings I have shown them attached at four places in the circumference) are fastened support members 26. These support members are formed with upturned lugs 27 which engage the annular guide member 25 and allow the slidable housing 5 to slide or rotate on the wheel.

Fastened on the other side of the wheel to the support members 26 are catches 28 pivoted at 28' on the support members 26 which extend upward along the spokes and are provided with outwardly turned lips 29. An annular channel member 31 is adapted at its exterior to bear against the outwardly turned lips 29. The channel 31 is provided at its innermost lower end with straps 32 which are adapted to be held firmly in place against the catches 28 by means of cotter pins 33, which pass through catches 28 and passing through suitable apertures in the straps 32 hold the strap firmly against the catches 28.

This structure of pivoted catches and detachable channel member permits the channel member to be removed readily by withdrawing the cotter pin 33 and allows the catches 28 to fall down so that the bolts normally used to hold the tire upon the felly may be tightened or adjusted as required.

The chains 11 are provided with hooks 35 which are adapted to engage the channel 31 and hold the chains 11 over the tires 1.

In operation the chains 11 are withdrawn into the housing 5. Only a portion of the snaps 35 are projecting therefrom. By grasping the snaps 35 the chains 11 may be withdrawn through the apertures 9 into the position shown in Fig. 3 where the stops 12 prevent the chains from passing entirely out through the apertures 9. In this position the flexible member 22 has been unwound from the drums 14 as shown in Fig. 3. The hooks 35 are snapped under the channel 31 and the chains are thus extended across the tire. In case any strain is brought on the chains 11 they may give slightly and slide around the tire since the slidable housing 5 may travel and the hook 35 will slide within the channel 31. In actual operation the chains have been found to gradually creep around the tire in an exactly similar manner to the chain, commercially known as the Weed detachable tire chain.

Upon disengaging the hook 35 from the channel 31 the chain is withdrawn within the housing by means of the tension of the springs 18 tending to rewind the drums 14.

I have devised a series of quickly and easily detachable tire chains which may be carried by the wheel and quickly snapped into place when required. By my structure which permits the housing to slide when the chains are subjected to too heavy a strain I have prevented breakage of the chains and likewise wearing of the tires at any particular place more than at others. It is to be understood that the tire chains do not slip too easily but only when they are subjected to unusual strains which would break the chains were they not permitted to move to a certain extent.

I claim as my invention:

1. In an anti-skid device, the combination with a vehicle wheel and a tire therefor, of a plurality of chains adapted to fit over the tire, means permanently fastened to the wheel structure permitting the chains to slide longitudinally of the tire and means to wind up the chains when off the tire.

2. An anti-skid device for tires of vehicle wheels comprising a plurality of chains adapted to fit over the tire, a housing on one side of the vehicle wheel adapted to slide thereon but permanently attached thereto and to which the chains are fastened, a detachable channel on the other side of the wheel to which the chains may be fastened, said housing and channel permitting the chains to slide longitudinally of the tire and means to wind up the chains.

3. An anti-skid device for tires of vehicle wheels comprising a plurality of chains adapted to fit over the tire, a housing on one side of the vehicle wheel adapted to slide thereon but permanently attached thereto and to which the chains are fastened, a detachable channel on the other side of the wheel to which the chains may be fastened, said channel and housing permitting the chains to slide longitudinally of the tire, support members on the spokes and snaps on the support members to hold the channel in place and means in the housing to draw in the chains when off the tire.

4. An anti-skid device for tires of vehicle wheels comprising a plurality of chains adapted to fit over the tire, a housing on one side of the vehicle wheel adapted to slide thereon but permanently attached thereto and to which the chains are fastened, a detachable channel on the other side of the wheel to which the chains may be fastened, said housing and channel permitting the chains to slide longitudinally of the tire, support members on the spokes, snaps on the support members to hold the channel in place, lugs on the support members, a guide member on the housing cooperating with the lugs to allow the housing to rotate on the wheel and means in the housing to draw in the chains when off the tire.

5. An anti-skid device for tires of vehicle wheels comprising a plurality of chains adapted to fit over the tire, support members on the spokes, lugs on the support member, a slidable housing for the chains on one side of the wheel, a guide member on the housing in which the lug on the support member are adapted to fit, a channel on the other side of the wheels to which the ends of the chains may be fastened and snaps on the support members to hold the channel in place.

6. An anti-skid device for tires of vehicle wheels comprising a plurality of chains adapted to fit over the tire, support members on the spokes, lugs on the support member, a slidable housing for the chains on one side of the wheel, a guide member on the housing in which the lug on the support member are adapted to fit, a channel on the other side of the wheels to which the ends of the chains may be fastened and snaps on the support members to hold the channel in place, and spring means within the housing to retain the chains therein when not stretched over the wheel.

7. An anti-skid device for tires of vehicle wheels comprising a plurality of chains adapted to fit over the tire, a housing on one side of the wheel adapted to slide thereon but permanently attached thereto, drums in the housing, springs to wind up said drums, flexible members attached to the drums to withdraw the chains into the housing, and means on the other side of the wheel to which the chains may be fastened, said housing and said means permitting the chains to slide longitudinally of the tire.

8. An anti-skid device for tires of vehicle wheels comprising a plurality of chains adapted to fit over the tire, a housing on one side of the vehicle wheel adapted to slide thereon but permanently attached thereto, drums in the housing, springs to wind said drums, flexible members adapted to be snapped on the drums and attached to the chains, stops on the chains, hooks on the chains, means on the other side of the wheel to which the hooks on the chains may be fastened, said housing and said means permitting the chains to slide longitudinally of the tire.

9. An anti-skid device for tires of vehicle wheels comprising a plurality of chains adapted to fit over the tire, support members on the spokes, lugs on the support members, a slidable housing for the chains on one side of the wheel, a guide member on the housing in which the lugs on the support member are adapted to fit, a channel on the other side of the wheel to which the ends of the chains may be fastened, snaps on the support member to hold the channel in place, drums in the housing, springs to wind said drums, flexible members adapted to be snapped on the drums and attached to the chains, stops on the chains permitting them to be withdrawn only a predetermined distance and hooks on the ends of the chains by which they may be made to engage with the channel.

In testimony whereof I affix my signature.

ALFRED LOWTHER FORREST.